United States Patent
Cheong

[11] Patent Number: 5,936,702
[45] Date of Patent: Aug. 10, 1999

[54] SCREW FOR SECURING OPTICAL LENS TO CLASP

[76] Inventor: Lak Cheong, 38 Tai Tam Road, Blk 4A, 11/F, Pacific View, The Hong Kong Special Administrative Region of the People's Republic of China

[21] Appl. No.: 09/120,472

[22] Filed: Jul. 23, 1998

[51] Int. Cl.⁶ .................................................. G02C 5/00
[52] U.S. Cl. ............................... 351/141; 351/47; 351/57
[58] Field of Search .............................. 351/47, 57, 140, 351/141, 178

[56] References Cited

U.S. PATENT DOCUMENTS

| D. 350,359 | 9/1994 | Friedman | D16/334 |
|---|---|---|---|
| 1,909,796 | 5/1933 | Anderson | 351/47 |
| 1,971,055 | 8/1934 | Shindel | 351/47 |
| 2,065,458 | 12/1936 | Hines | 351/47 |
| 2,132,346 | 10/1938 | Richards | 351/47 |
| 2,159,710 | 5/1939 | Reichert | 351/47 |
| 2,511,776 | 6/1950 | Kelly | 351/47 |
| 2,538,692 | 1/1951 | Lindblom | 351/47 |
| 2,678,584 | 5/1954 | Eyles | 351/47 |
| 2,770,167 | 11/1956 | Passet | 351/47 |
| 3,575,497 | 4/1971 | LeBlanc | 351/47 |
| 4,119,369 | 10/1978 | Eloranta et al. | 351/49 |
| 4,154,513 | 5/1979 | Goulden | 351/47 |
| 4,659,196 | 4/1987 | Gazeley | 351/57 |
| 4,890,910 | 1/1990 | Gazeley | 351/47 |
| 5,123,724 | 6/1992 | Salk | 351/57 |
| 5,164,749 | 11/1992 | Shelton | 351/47 |
| 5,654,785 | 8/1997 | Shih et al. | 351/47 |
| 5,838,417 | 11/1998 | Dahan et al. | 351/178 |

*Primary Examiner*—Huy Mai
*Attorney, Agent, or Firm*—Robert L. Epstein, Esq.; Harold James, Esq.; James & Franklin, LLP

[57] ABSTRACT

The clip-on sunglasses assembly includes four clasps for engaging the frame of eyeglasses. Each includes a screw which secures the sunglass lens within a recess in the clasp. The end of the screw is provided with a central recess defining a circular edge. As the screw is tightened, the edge contacts the lens and forms a circular groove in the lens surface by displacing a small amount of lens material. The circular contact area distributes the stress normally concentrated at a point on the lens by a conventional screw, thereby reducing the chances of cracking the lens. Two clasps are welded to the ends of a bridge member and affixed to pre-shaped lenses at marked locations. Each clasp has a bent tail bar enclosed by a heat shrinkable tube.

23 Claims, 4 Drawing Sheets

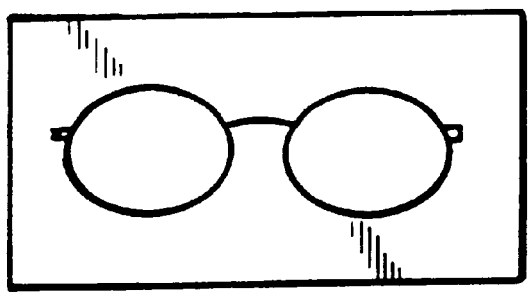
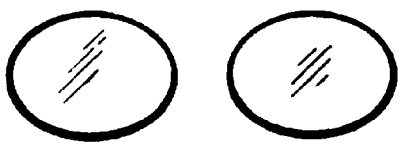
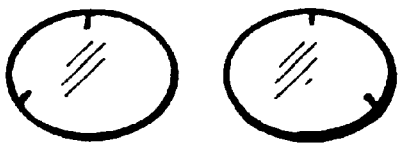
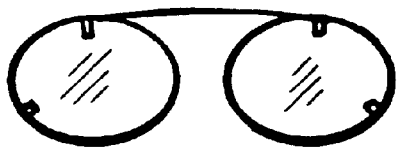
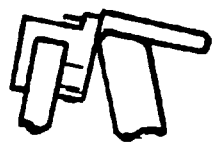
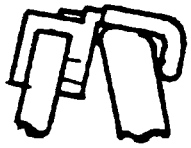
FIG.6

SCREW FOR SECURING OPTICAL LENS TO CLASP

The present invention relates to a clip-on sunglasses assembly and more particularly to a screw for securing the sunglass lenses to clasps which permit the assembly to be removeably mounted on eyeglasses and to a method for utilizing same to customize such assemblies to fit different size and shape eyeglasses configurations.

Although the present invention is primarily intended and hence described herein for use in securing sunglass lenses employed in clip-on sunglasses assemblies, the type of lenses to be secured should not be considered to be a limitation on the invention. The present invention will serve equally well to secure any type of optical lens. For example, prescription lenses could be secured to a clip-on assembly designed to be mounted over eyeglasses to modify the present prescription, such as to form bifocal lenses for reading.

Clip-on sunglasses assemblies include a metal or plastic frame member which carries a pair of light attenuating plastic or glass lenses. A mechanism is provided for removeably mounting the clip-on assembly on eyeglasses. Conventional mounting mechanisms either attach to the bridge of the eyeglasses (known as "center bridge mount") or to the periphery of the eyeglass frame.

In order to be commercially acceptable, the clip-on assembly must be light in weight, rugged and inexpensive. It must be easy to mount and to remove from the eyeglasses. It must also mount without damaging the eyeglasses, particularly the lenses.

One common type of center bridge mounting mechanism utilizes a clamp mounted on the bridge of the clip-on assembly. The clamp includes pairs of opposing clamp parts which are spring loaded toward each other so as to frictionally engage the lenses of the eyeglasses therebetween. Examples of this type of clamp are disclosed in U.S. Pat. No. 3,575,497 issued Apr. 20, 1971 to Leblanc, U.S. Pat. No. 5,164,749 issued Nov. 17, 1992 to Shelton and U.S. Design Pat. No. Des 350,359 issued Sep. 6, 1994 to Friedman.

These prior art clamp mechanisms have the advantage of being able to fit a variety of different eyeglasses styles. However, they have their drawbacks. The clamp mechanism consists of several parts which must be fabricated and assembled, making them relatively expensive and not very reliable. The parts clamp tightly to the lenses, potentially scratching the lenses. Moreover, they may obstruct the view partially.

The peripheral type mounting mechanisms do not have the drawbacks of the center bridge clamp. However, because they must be positioned to fit the eyeglasses frame precisely, the assembly which utilizes this type of mounting must be customized for each frame. Such mechanisms employ a number of clasps which permit the assembly to "snap-fit" over an eyeglasses frame. One example of this type of clip-on mount is illustrated in U.S. Pat. No. 5,123,724 issued Jun. 23, 1992 to Salk. The clasps are affixed to and carry the sunglass lenses. The clasps must retain the lenses in a manner which is secure enough to carry the weight of the lens and to prevent relative movement of the lens. This must be accomplished without unduly stressing the lens surface, which can lead to cracking of the lens.

Salk, for example, teaches the use of adhesive to secure the lens to the clasp. However, adhesive is messy, difficult for opticians to use and may not retain the lenses securely. Others have used screws to clamp the lenses within recesses in the clasps. However, conventional screws will not retain the lenses securely r unless they are extremely tight. Tightening the screw sufficiently to properly secure the lens may cause the lens to crack because the screw end tends to apply a high stress force on the lens in a very small area.

Because the clasps are situated on the periphery of the lenses of the assembly, in order to appropriately fit the frame of the eyeglasses, the assembly must be customizeable so as to fit the particular one of the large number of different size and shape frames upon which the assembly will be used. It is therefore necessary to fabricate the clasps such that they can be easily affixed to the lenses by the optician at any location which is required.

In order to overcome the problems associated with cracking the lenses and at the same time provide clasps which permit customization, I have invented a unique screw for use in the clasps forming a clip-on sunglasses assembly which securely retain the lens without cracking them. The screw is simple in structure, inexpensive and reliable. It enables an optician to customize the clip-on assembly to fit a wide variety of different size and shape eyeglasses in an easy and quick fashion.

It is, therefore, a prime object of the present invention to provide a clasp for securing an optical lens which utilizes a uniquely structured screw which adequately secures the lens without causing it to crack.

It is another object of the present invention to provide a clasp for securing an optical lens which utilizes a screw designed to distribute the stress applied to the lens surface over a relatively large area.

It is another object of the present invention to provide a clasp for securing are optical lens which permits a clip-on assembly to be customized to fit a large variety of different size and shaped eyeglasses in a simple and efficient manner.

In accordance with one aspect of the present invention, a screw for securing an optical lens to a clasp is provided. The screw includes a body with an end adapted to abut the lens surface. The screw end includes means for forming a groove in the lens surface as the screw is rotated.

The groove forming means comprises a recess which defines an edge in the screw end. The edge is spaced from the center of the screw and is preferably substantially circular. The edge is preferably relatively sharp.

The screw body has an axis about which it is rotated to tighten the screw. Preferably, the recess is located on the axis.

In accordance with another aspect of the present invention, a clasp for retaining an optical lens is provided. The clasp includes a wall with an internally threaded screw receiving opening. A screw with an externally threaded body is adapted to be received within the opening. The screw body has an end adapted to abut the lens surface when the screw is rotatably received in the opening. The end of the screw includes means for forming a groove in the lens surface as the screw is rotated within the opening.

The groove forming means comprises a recess which defines an edge in the screw end. The edge is spaced from the center of the screw and is preferably substantially circular. The edge is preferably relatively sharp.

The screw body has an axis. The recess is located on the screw body axis.

The edge forms a substantially circular groove in the lens surface. The externally threaded screw wall cooperates with the internally threaded clasp opening as the screw is rotated to cause the screw to form the groove.

A second wall is provided as part of the clasp. The second wall is spaced from the first wall a distance greater than the thickness of the optical lens.

The clasp further includes a tail bar. The tail bar extends from the first wall.

A bridge member is affixed to the clasp. The bridge member has an end. The clasp is affixed to the end of the bridge member.

In accordance with another aspect of the present invention, a method of forming a custom clip-on assembly for eyeglasses is provided. The method utilizes first and second clasps affixed to opposite ends of a bridge element, each clasp including a screw having an end with a recess defining an edge and a tail bar. The method comprises the steps of:

(a) forming first and second optical lenses to conform to the shape of eyeglasses, (b) marking places on each of the first and second optical lenses where the first and second clasps are to be located, (c) aligning the first and second clasps respectively with the markings, (d) inserting the optical lenses into the clasps;

(e) rotating the screws such that the end of each screw forms a substantially circular groove in the surface of each optical lens, (f) aligning the clip-on assembly with the eyeglasses, and (g) bending the tail bars of the clasps to engage the frame of the eyeglasses.

The method also comprises the step of affixing third and fourth clasps to the optical lenses.

To these and to such other objects which may hereinafter appear, the present invention relates to a clasp for securing optical lenses, as described in detail in the following specification and recited in the annexed claims, taken together with the accompanying drawings, in which like numbers refer to like parts and in which:

Figure 5:
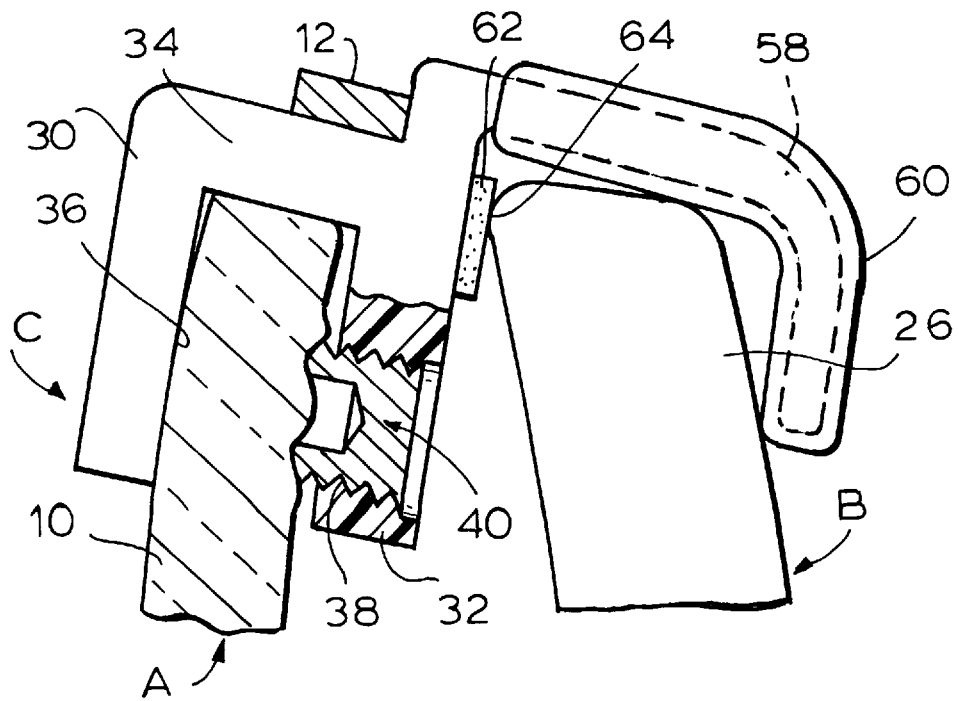

FIG. 5 s a greatly enlarged cross-sectional view of a clasp with its tail bar bent to engage the eyeglass frame; and FIG. 6 is a flow chart showing the steps for fabricating a custom clip-on assembly with the clasps of the present invention.

Figure 1:
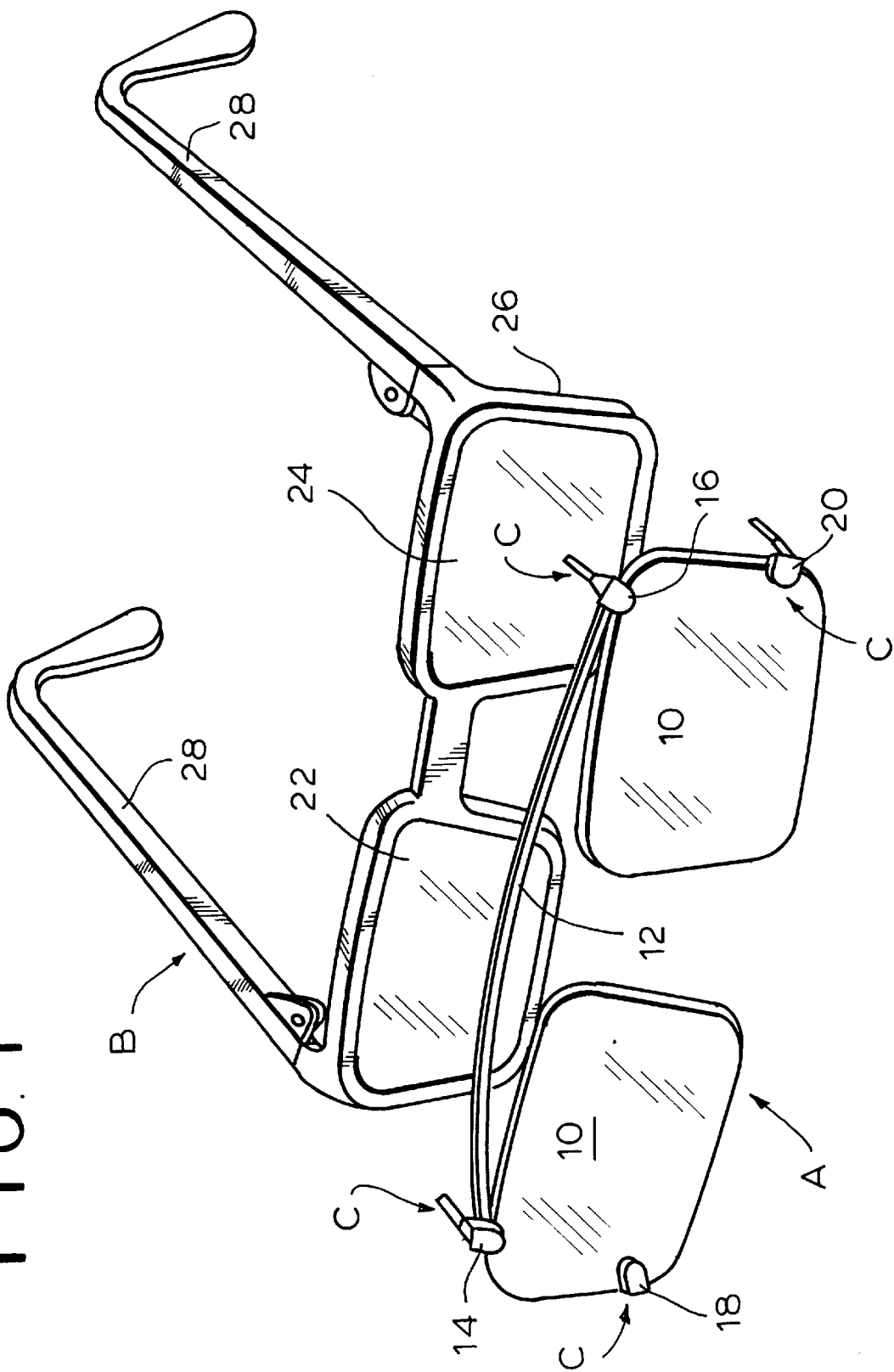
FIG. 1 is an exploded isometric view of a typical clip-on assembly with the clasps of the present invention and eyeglasses which the assembly has been customized to fit.

As seen in FIG. 1, a clip-on assembly, generally designed A, is fabricated to be removeably mounted on a pair of eyeglasses, generally designated B, through the use of clasps, generally designated C, four of which are shown. As described in detail below, the assembly A is customized to accomodate the size and shape of the eyeglasses B.

Assembly A includes a pair of optical elements or lenses 10, usually light attenuating in nature. Lenses 10 may be made of glass or plastic. A bridge member 12 is welded or otherwise affixed at each end to one of two upper clasps 14, 16. Lower clasps 18, 20 are positioned on the lower portions of the lenses 10. The bridge member is formed of thin metal so it can "flex" to permit mounting and removal of the clip-on assembly from the eyeglasses.

Eyeglasses B consist of optical lenses 22, 24 and a metal or plastic frame 26 with hinged temple parts 28. Frame 26 retains lenses 22, 24.

Figure 2:
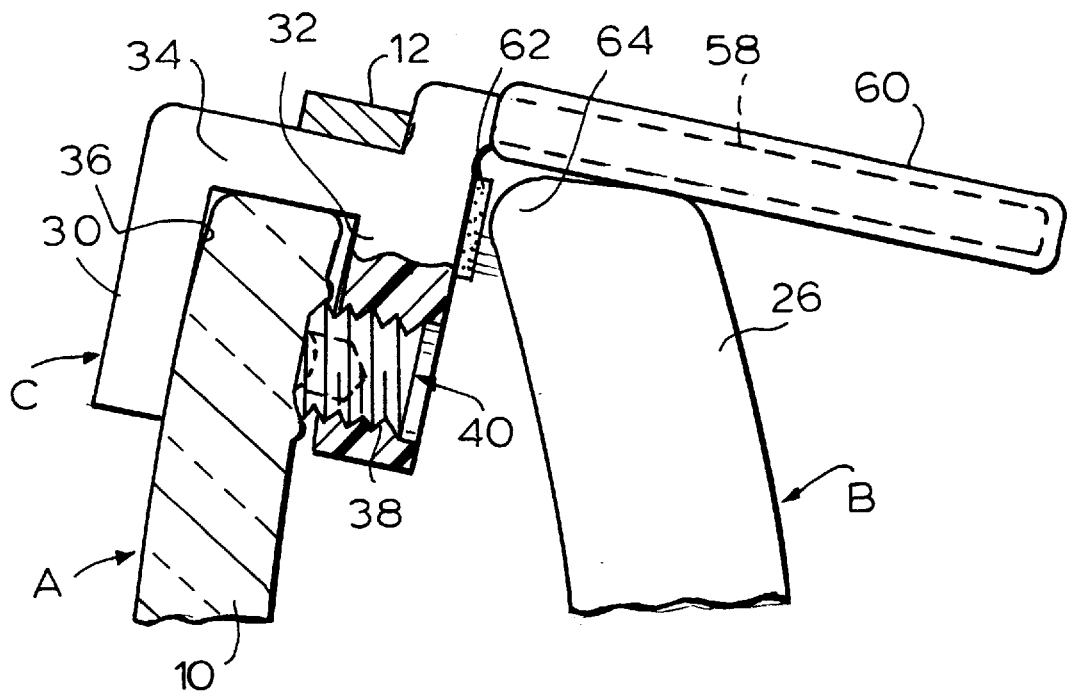
FIG. 2 is a greatly enlarged cross-sectional view of one of the clasps of the present invention, prior to bending the tail bar.

As best seen in FIG. 2, each clasp C is made of metal and includes a front wall 30, a rear wall 32 and a connecting part 34. Part 34 spaces walls 30, 32 apart and maintains the walls in a generally parallel relationship so as to form a lens receiving recess 36 therebetween.

Wall 32 has an internally threaded bore 38 which extends through it and which is adapted to receive a screw 40. The structure of screw 40 is best seen in FIG. 3.

Figure 3:
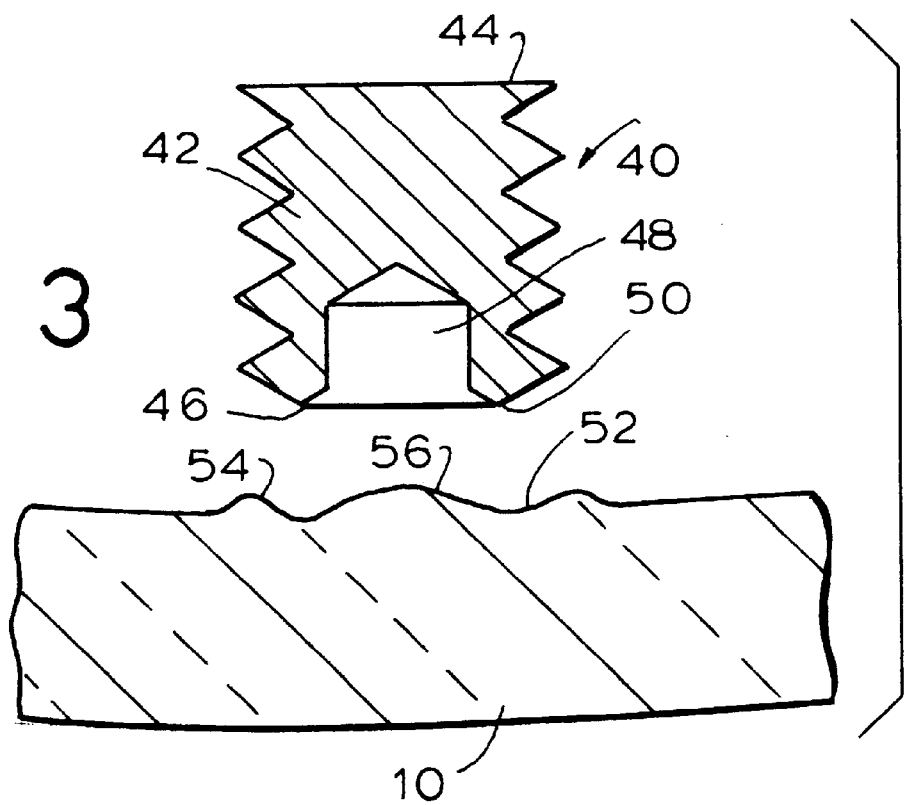
FIG. 3 is a greatly enlarged cross-sectional view of the screw utilized in the clasp and a greatly enlarged (idealized) cross-sectional view of the lens surface, with a groove formed by the screw.

FIG. 3 shows that screw 40 has an externally threaded cylindrical body 42 with a head 44 on one end. The other end 46 of the screw is adapted to abut the surface of lens 10. Head 44 normally has a groove (not shown) adapted to accept the blade of a jeweler's screw driver, as is conventional. However, other head configurations are possible.

End 46 is provided with a central recess 48, preferrably centered on the central axis of the screw. Recess 48 defines an edge 50 spaced from the screw axis. Edge 50 is preferrably circular and is relatively sharp.

Figure 4:
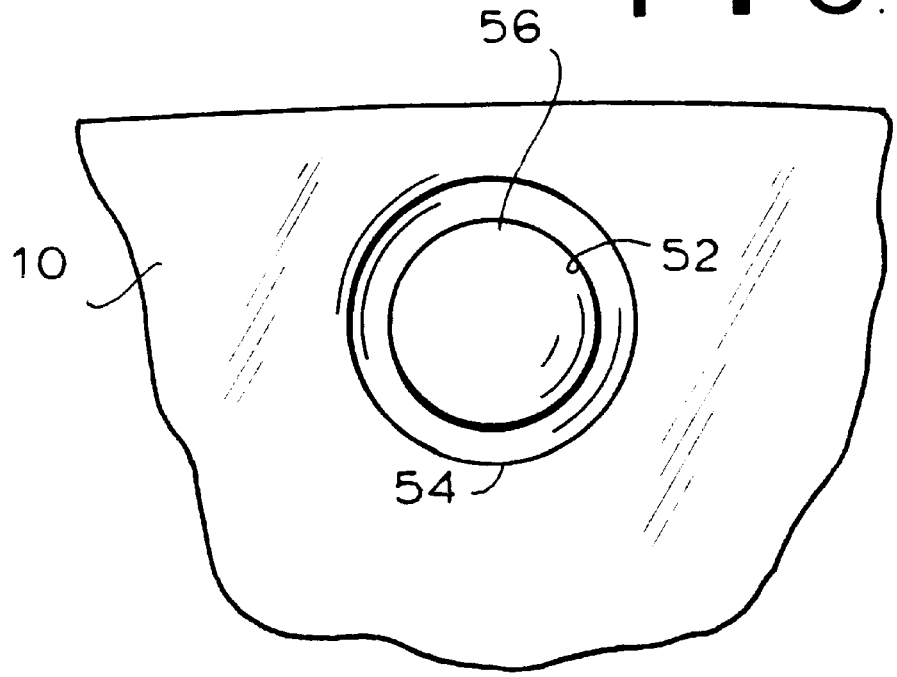
FIG. 4 is a greatly enlarged (idealized) elevational view of the lens surface with the groove.

When screw 40 is rotated relative to wall 32 such that it advances towards wall 30 to clamp the lens, edge 50 displaces a small amount of the lens material and an arcuate groove 52 is formed in the lens surface. As illustrated in idealized form in FIGS. 3 and 4, groove 52 will be substantially circular after the screw has been rotated at least once about its axis. Groove 52 is defined between an outer ring-like accumulation of material 54 and a central mound of material or protrusion 56. This distributes the stress applied to the lens surface by the screw over a substantial area, instead of being concentrated at a single point, as is the case with conventional screws. Thus, the screw can be tightened to adequately secure the lens relative to the clasp, without causing the lens to crack.

Extending from wall 32 is a tail bar 58 which has a heat shrinkable plastic sleeve 60 surrounding it. As best seen in FIG. 5, bar 58 is bent to form a recess to engage the frame of the eyeglasses. A protective layer 62 is provided on the surface of wall 32 where it is contacted by corner 64 of frame 26 to provide cushioning and prevent damage to the frame.

FIG. 6 illustrates the steps in the custom fabrication process. The factory supplies a bridge element with first and second clasps affixed to the opposite ends. First, the optician or other optical worker traces the outline of eyeglasses B on to a flat sheet. The optical lenses 10 to be used in the clip-on assembly are edged, such that their size and shape matches that of the eyeglasses. Next, the lenses 10 are marked to indicate where the clasps C will be positioned. The bridge element 12, with upper clasps 14, 16 welded to each end, is aligned with the markings for the upper clasps. Clasps 18 and 20 are positioned over the markings for the lower clasps. All clasps are secured by tightening screws 40. The clip-on assembly is aligned with the eyeglasses and tail bars 58 are bent so as to engage the frame 26 of the eyeglasses.

It will now be appreciated that the present invention relates to a clasp for securing opitcal lenses in a clip-on assembly which utilizes a uniquely structured screw to secure the lens without cracking the lens. This is accomplished by creating a recess in the screw which defines a circular edge. As the screw is rotated, lens material is displaced forming a circular groove in the lens surface which distributes the stress applied to the lens over a relatively large area, instead of concentrating it at a single point, which would tend to promote the formation of a crack in the lens.

While only a single preferred embodiment of the present invention is disclosed for purposes of illustration, it is obvious that many variations and modifications could be made thereto. It is intended to cover all of these variations and modifications which fall within the scope of the present invention, as defined by the following claims:

I claim:

1. A screw for securing an optical lens to a clasp comprising a body with an end adapted to abut the lens surface of said lens, said end comprising means for forming a groove in the lens surface as the screw is moved relative to the lens surface.

2. The screw of claim 1 wherein said groove forming means comprises a recess.

3. The screw of claim 2 wherein said recess defines an edge in said end.

4. The screw of claim 3 wherein said edge is substantially circular.

5. The screw of claim 3 wherein said edge is relatively sharp.

6. The screw of claim 2 wherein said screw body has an axis and wherein said recess is located on said axis.

7. The screw of claim 1 wherein said screw has an axis and wherein said groove forming means comprises an edge spaced from said axis.

8. A clasp for retaining an optical lens comprising a wall with an screw receiving opening, a screw having an externally threaded body with an end adapted to abut the lens surface of said lens when said screw is rotatably received in said opening, said end comprising means for forming a groove in the lens surface as said screw is rotated relative to said wall.

9. The clasp of claim 8 wherein said groove forming means comprises a recess.

10. The clasp of claim 9 wherein said recess defines an edge in said end.

11. The clasp of claim 10 wherein said edge is substantially circular.

12. The clasp of claim 11 wherein said edge is relatively sharp.

13. The clasp of claim 11 wherein said edge forms a substantially circular groove in the lens surface as said screw is rotated.

14. The clasp of claim 9 wherein said body has an axis and wherein said recess is located on said axis.

15. The clasp of claim 8 wherein said screw body has an axis and wherein said groove forming means comprises an edge spaced from said axis.

16. The clasp of claim 15 wherein said edge forms an arcuate groove in the lens surface as the screw is rotated.

17. The clasp of claim 8 further comprising a second wall spaced from said first wall a distance greater than the thickness of the optical lens.

18. The clasp of claim 8 further comprising a tail bar.

19. The clasp of claim 18 wherein said tail bar extends from said wall.

20. The clasp of claim 8 further comprising a bridge member affixed to the clasp.

21. The clasp of claim 20 wherein said bridge member has an end and wherein said clasp is affixed to said end of said bridge member.

22. A method of forming a custom clip-on assembly for eyeglasses utilizing first and second clasps affixed at opposite ends of a bridge element, each clasp including a screw with an end having groove forming means and a tail bar, the method comprising the steps of:

(a) forming first and second optical lenses to conform to the shape of eyeglasses, (b) marking places on the first and second optical lens where the first and second clasps are to be located, (c) aligning the first and second clasps respectively with the markings, (d) inserting the optical lenses into the clasps;

(e) tightening the screws such that each screw forms a substantially circular groove in the respective surface of each said optical lens, (f) aligning the clip-on assembly with the eyeglasses, and (g) bending the tail bars of the clasps to engage the frame of the eyeglasses.

23. The method for claim 21 further comprising the step of affixing third and fourth clasps to the optical lenses.

* * * * *